United States Patent Office 3,470,173
Patented Sept. 30, 1969

3,470,173
1-CHLORO-CYCLOALKANE-1-CARBOX AMIDES
Gerhard H. Alt, Creve Coeur, Mo., assignor to Monsanto Company, St. Louis, Mo., a corporation of Delaware
No Drawing. Filed May 23, 1966, Ser. No. 551,929
Int. Cl. C07d *87/34;* C07c *103/76;* A61k *27/00*
U.S. Cl. 260—247.7
9 Claims

ABSTRACT OF THE DISCLOSURE

Compounds of the formula

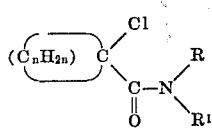

wherein R and $R^1$ are alkyl having a maximum of 12 carbon atoms or together form a divalent group selected from the group consisting of —$CH_2CH_2CH_2$—, —$CH_2CH_2OCH_2CH_2$—,
—$CH_2CH_2CH_2CH_2$—, —$CH_2(CH_2)_3CH_2$—, and
—$CH_2(CH_2)_4CH_2$— and $n$ is an integer of from 3 to 10 thus forming an alicyclic ring which may have a maximum of three methyl substituents.

These compounds may be used as feed additives.

---

This invention relates to a new class of chemical compounds and methods for their preparation. More specifically, the application describes and claims compounds which are useful additives for animal feeds, providing a growth stimulation and a means of controlling populations of parasitic helminths.

The new class of compounds have the generic formula

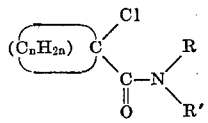

wherein $n$ is an integer of from *about* three to *about* ten providing a cyclic group of the class consisting of alicyclic rings and said rings having up to three methyl substituents; and wherein R and R' are selected from the class consisting of alkyl of up to 12 carbon atoms and such that R and R' together form a divalent moiety selected from the class consisting of —$CH_2CH_2CH_2$—, —$CH_2(CH_2)_2CH_2$—, —$CH_2(CH_2)_3CH_2$—,
$CH_2CH_2OCH_2CH_2$—, —$CH_2(CH_2)_4CH_2$—

The new compounds are prepared by the following reaction:

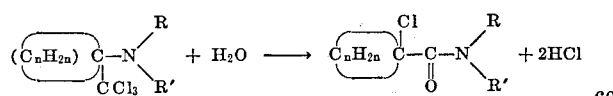

wherein the $n$, R and R' are as above defined.

This reaction is conducted by heating the trichloromethyl derivative at a temperature between about 50° C. and about 100° C. in an aqueous organic solvent. Suitable solvent media are mixtures of water and inert organic liquids which are at least partly soluble in water, for example, ethyl alcohol, acetone, ethylene glycol and other water soluble ketones and alcohols. The reaction temperature can be the reflux temperature of the solvent medium.

The trichloromethyl reactants used in the practice of the novel procedure can be prepared by the procedure described and claimed in the copending application Ser. No. 551,914, filed May 23, 1966, by Gerhard H. Alt.

Further details of this invention are set forth in the following examples.

EXAMPLE 1

A solution of N[1-(trichloromethyl)cyclohexyl]morpholine was dissolved in 90% ethanol and heated at reflux for 18 hours. The ethanol was evaporated and the residue dissolved in benzene and separated by distillation. The resulting product was identified as N-(1-chlorocyclohexylcarbonyl)morpholine.

EXAMPLE 2

A solution of N[1-(trichloromethyl)cyclopentyl]morpholine was dissolved in aqueous acetone and then heated at reflux for 18 hours. The acetone was evaporated in vacuo and the residue dissolved in chloroform. The product, separated by distillation, was identified as N-1-(chlorocyclopentylcarbonyl)morpholine.

EXAMPLE 3

By using N[1-(trichloromethyl)cyclobutyl]piperidine in the procedure of Example 1, a product was recovered and identified as N-(1-chlorocyclobutylcarbonyl)piperidine.

EXAMPLE 4

An ethanol solution of N[1-(trichloromethyl)-3-chloro-5,5-dimethylcyclohex-yl]hexamethyleneimine was heated at reflux temperature. A product was recovered from the reaction mixture and identified as N-(1,3-dichloro-5,5 - dimethylcyclohex - 2 - enylcarbonyl)hexamethyleneimine.

EXAMPLE 5

The procedure of Example 2 was duplicated except that N[1-(trichloromethylcyclohexyl)pyrrolidine was refluxed in acetone solution. The product recovered was N-(1-chlorocyclohexylcarbonyl)pyrrolidine.

EXAMPLE 6

N-didoecyl(1-trichloromethyl)cyclohexylamine was refluxed in ethanol solution. The product recovered from the reaction mixture was identified as having the structure

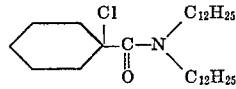

EXAMPLE 7

A trichloromethyl derivative of the formula

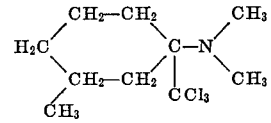

was refluxed in acetone solution. When the reaction was complete the product was identified as having the structure

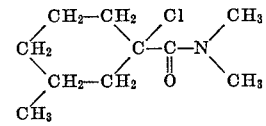

EXAMPLE 8

By refluxing N[1-trichlorocyclopentyl]pyrrolidine in 90 percent aqueous ethanol the product recovered was identified as N(1-chlorocyclopentylcarbonyl)pyrrolidine.

Although the invention is described with respect to specific embodiments, it is not intended that the details thereof be construed as limitations on the scope of the invention.

What is claimed is:

1. A compound of the formula

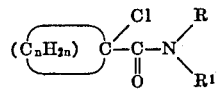

wherein $n$ is an integer of three to five providing a hydrocarbon ring of the class consisting of alicyclic rings and said alicyclic rings having up to three methyl substituents; wherein R and $R^1$ are selected from the class consisting of alkyl of up to 12 carbon atoms and alkyl moieties such that R and $R^1$ together is a divalent group of the class consisting of $$-CH_2CH_2-CH_2-,\ -CH_2(CH_2)_2CH_2-,$$
$$-CH_2CH_2-O-CH_2CH_2-,\ -CH_2(CH_2)_3CH_2-,$$
$$-CH_2(CH_2)_4CH_2-$$

2. The compound of claim 1 wherein R and R' together is $-CH_2CH_2OCH_2CH_2-$ and $n$ is 5.

3. The compound of claim 1 wherein R and R' together is $-CH_2CH_2OCH_2CH_2$ and $n$ is 4.

4. The compound of claim 1 wherein R and R' together is $-CH_2CH_2CH_2CH_2$ and $n$ is 5.

5. The compound of claim 1 wherein R and R' together is $-CH_2CH_2CH_2CH_2-$ and $n$ is 4.

6. The compound of claim 1 wherein R and R' are each methyl and $n$ is 5.

7. A method of preparing a compound of the formula

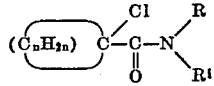

wherein $n$ is an integer of three to five providing a hydrocarbon ring of the class consisting of alicyclic rings and said alicyclic rings having up to three methyl substituents; wherein R and $R^1$ are selected from the class consisting of alkyl of up to 12 carbon atoms and alkyl moieties such that R and $R^1$ together is a divalent group of the class consisting of $-CH_2CH_2-CH_2-,\ -CH_2(CH_2)_2CH_2-,$
$-CH_2CH_2-O-CH_2CH_2-,\ -CH_2(CH_2)_3CH_2-,$
$-CH_2(CH_2)_4CH_2-$; which comprises heating a compound of the formula

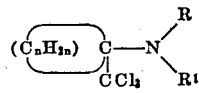

in an inert aqueous organic solvent at a temperature from about 50° C. to 100° C.

8. The method of claim 7 wherein R and R' together is $-CH_2CH_2OCH_2CH_2-$ and $n$ is 5.

9. The method of claim 7 wherein R and R' together is $-CH_2CH_2OCH_2CH_2-$ and $n$ is 4.

No references cited.

NICHOLAS S. RIZZO, Primary Examiner

J. TOVAR, Assistant Examiner

U.S. Cl. X.R.

260—239, 294.7, 326.5, 557; 424—244, 248, 267, 274, 320